United States Patent
Arriens et al.

(10) Patent No.: US 10,766,158 B2
(45) Date of Patent: Sep. 8, 2020

(54) OSCILLATING BLADE FOR FOOD PROCESSOR SYSTEM

(71) Applicant: SharkNinja Operating LLC, Newton, MA (US)

(72) Inventors: Ross Douglas Arriens, Somerville, MA (US); Charles Stewart Brunner, North Reading, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 400 days.

(21) Appl. No.: 15/605,321

(22) Filed: May 25, 2017

(65) Prior Publication Data
US 2017/0341253 A1    Nov. 30, 2017

Related U.S. Application Data

(60) Provisional application No. 62/341,206, filed on May 25, 2016.

(51) Int. Cl.
*B26D 3/22* (2006.01)
*B26D 3/18* (2006.01)

(52) U.S. Cl.
CPC ............... *B26D 3/22* (2013.01); *B26D 3/185* (2013.01); *B26D 2210/02* (2013.01)

(58) Field of Classification Search
CPC . B26D 3/185; B26D 3/20; B26D 3/22; B26D 11/00; B26D 2011/005
USPC ...... 99/509, 510, 511; 241/92, 101.1, 282.1; 83/425.1, 865, 932, 663; 30/303, 305, 30/299, 124
See application file for complete search history.

(56) References Cited

U.S. PATENT DOCUMENTS

| | | | |
|---|---|---|---|
| 3,664,396 A * | 5/1972 | Tremblay | B26D 3/18 425/152 |
| 5,445,332 A | 8/1995 | Shimizu et al. | |
| 5,911,808 A | 6/1999 | Mendenhall | |
| 5,983,769 A * | 11/1999 | Schneider | A47J 43/255 241/101.4 |
| 7,543,768 B2 | 6/2009 | Cohen et al. | |
| 8,051,769 B2 | 11/2011 | Conti et al. | |
| 8,122,820 B2 | 2/2012 | Conti et al. | |
| 8,215,231 B2 * | 7/2012 | Bigge | A47J 43/0722 241/100 |

(Continued)

FOREIGN PATENT DOCUMENTS

| | | |
|---|---|---|
| DE | 10057835 A1 | 8/2002 |
| EP | 2130471 A1 | 12/2009 |

(Continued)

OTHER PUBLICATIONS

International Search Report for International Application No. PCT/US2017/034183, International Filing Date May 24, 2017, dated Oct. 18, 2017, 7 pages.

(Continued)

*Primary Examiner* — Reginald Alexander
(74) *Attorney, Agent, or Firm* — Cantor Colburn LLP

(57) ABSTRACT

A food processing system includes a food processor wherein an initial operation of said food processor is configured to cut a food item in a first, generally vertical direction and a later operation of said food processor is configured to cut said food item in a second direction. The second direction is distinct from the vertical direction.

13 Claims, 8 Drawing Sheets

(56) References Cited

U.S. PATENT DOCUMENTS

| | | | |
|---|---|---|---|
| 8,371,199 B2 * | 2/2013 | Ghimire | B26D 3/20 |
| | | | 83/167 |
| 8,596,565 B2 * | 12/2013 | Fortin | A01D 46/005 |
| | | | 241/282.1 |
| 8,677,895 B2 | 3/2014 | Beber et al. | |
| 8,943,954 B2 | 2/2015 | Conti et al. | |
| 9,254,064 B2 | 2/2016 | Unteregger et al. | |
| 9,439,539 B2 * | 9/2016 | Gushwa | B26D 1/29 |
| 2009/0193983 A1 | 8/2009 | So | |
| 2014/0208917 A1 | 7/2014 | Whitney | |

FOREIGN PATENT DOCUMENTS

| | | | |
|---|---|---|---|
| EP | 2724650 A2 | 4/2014 | |
| FR | 2310844 A1 * | 12/1976 | ............... B26D 3/20 |
| FR | 2548573 A1 | 1/1985 | |
| WO | 9310948 A1 | 6/1993 | |
| WO | 2010012727 A1 | 2/2010 | |
| WO | 2014082235 A1 | 6/2014 | |
| WO | 2014096711 A1 | 6/2014 | |
| WO | 2014096713 A1 | 6/2014 | |
| WO | 2014096714 A1 | 6/2014 | |
| WO | 2014096715 A1 | 6/2014 | |
| WO | 2014142694 A1 | 9/2014 | |

OTHER PUBLICATIONS

Written Opinion for International Application No. PCT/US2017/034183, International Filing Date May 24, 2017, dated Oct. 18, 2017, 8 pages.

* cited by examiner

OSCILLATING BLADE FOR FOOD PROCESSOR SYSTEM

CROSS REFERENCE TO RELATED APPLICATIONS

This application claims the benefit of U.S. Provisional Application No. 62/341,206, filed May 25, 2016, the content of which is incorporated by reference in its entirety herein.

BACKGROUND

This application is directed to a food processor, and more particularly, to a food processor having one or more unique features designed for enhancing the safety, ease of use, and/or versatility of the food processor.

Blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

SUMMARY

According to one embodiment, a food processing system includes a food processor wherein an initial operation of said food processor is configured to cut a food item in a first, generally vertical direction and a later operation of said food processor is configured to cut said food item in a second direction. The second direction is distinct from the vertical direction.

In addition to one or more of the features described above, or as an alternative, further embodiments said first direction and said second direction are generally perpendicular to one another.

In addition to one or more of the features described above, or as an alternative, further embodiments said second direction includes a generally horizontal direction.

In addition to one or more of the features described above, or as an alternative, further embodiments comprising a stationary blade plate having a plurality of blades arranged about a periphery thereof, each of the plurality of blades having a distinct cutting configuration configured to cut the food item in a first plane of said two planes.

In addition to one or more of the features described above, or as an alternative, further embodiments comprising a blade assembly operably coupled to a rotatable component of said food processor, said blade assembly being arranged adjacent an underside of said blade disc.

In addition to one or more of the features described above, or as an alternative, further embodiments said blade assembly is configured to further cut said food item in said second direction.

In addition to one or more of the features described above, or as an alternative, further embodiments comprising a container having a hollow chamber, within which said blade plate is mounted.

In addition to one or more of the features described above, or as an alternative, further embodiments comprising at least one smaller container removably coupled to said container such that said smaller container is disposed within said hollow chamber, each smaller container being associated with one of said plurality of blades of said blade disc.

In addition to one or more of the features described above, or as an alternative, further embodiments comprising a lid including an opening arranged in communication with said food processor, wherein at least one of said opening and said blade plate is movable between a plurality of positions such that said opening is associated with one of said plurality of blades of said blade plate.

In addition to one or more of the features described above, or as an alternative, further embodiments said food processor further comprises at least one oscillating blade configured to cut a food item in said first direction.

In addition to one or more of the features described above, or as an alternative, further embodiments wherein movement of said oscillating blade is partially restricted by said lid.

In addition to one or more of the features described above, or as an alternative, further embodiments said food processor further comprises a rotatable assembly, and movement of said oscillating blade is driven by rotation of said rotatable assembly about an axis.

In addition to one or more of the features described above, or as an alternative, further embodiments said oscillating blade includes a plurality of first blades oscillating along a first axis and a plurality of second blades oscillating along a second axis, said second axis having a different orientation than said first axis.

In addition to one or more of the features described above, or as an alternative, further embodiments a second operation of said food processor is configured to cut said food item in another vertical direction, distinct from said vertical direction of said initial operation, said second operation occurring after said initial operation and before said later operation.

According to another embodiment, a food processing system includes a container for receiving a food item processed by said food processing system. A configuration of said processing performed by said food processing system is determined by a position of the food item as it enters said container.

In addition to one or more of the features described above, or as an alternative, further embodiments each configuration cuts said food item in a generally vertical direction.

In addition to one or more of the features described above, or as an alternative, further embodiments the food processing system further includes a stationary blade plate having a plurality of blades arranged at different positions thereon, each of the plurality of blades having a distinct cutting configuration.

In addition to one or more of the features described above, or as an alternative, further embodiments said position of said food item is aligned with one of the plurality of blades.

In addition to one or more of the features described above, or as an alternative, further embodiments the food processing system further includes a blade assembly operably coupled to a rotatable component of the food processing system, said blade assembly being arranged adjacent an underside of said blade plate.

In addition to one or more of the features described above, or as an alternative, further embodiments said food item is positioned at one of a first position arranged a center of the food processor and a second position adjacent an outer periphery of said food processor.

In addition to one or more of the features described above, or as an alternative, further embodiments comprising a lid including an opening arranged in communication with said food processor, said opening being movable between a plurality of positions.

In addition to one or more of the features described above, or as an alternative, further embodiments said food processor further comprises at least one oscillating blade configured to cut said food item in a generally vertical direction.

In addition to one or more of the features described above, or as an alternative, further embodiments wherein movement of said oscillating blade is partially restricted by an adjacent component of the food processing system.

In addition to one or more of the features described above, or as an alternative, further embodiments said food processor further comprises a rotatable assembly and movement of said oscillating blade is driven by rotation of said rotatable assembly about an axis.

In addition to one or more of the features described above, or as an alternative, further embodiments said oscillating blade includes a plurality of first blades oscillating in a first direction and a plurality of second blades oscillating in a second direction, said second direction being different than said first direction.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
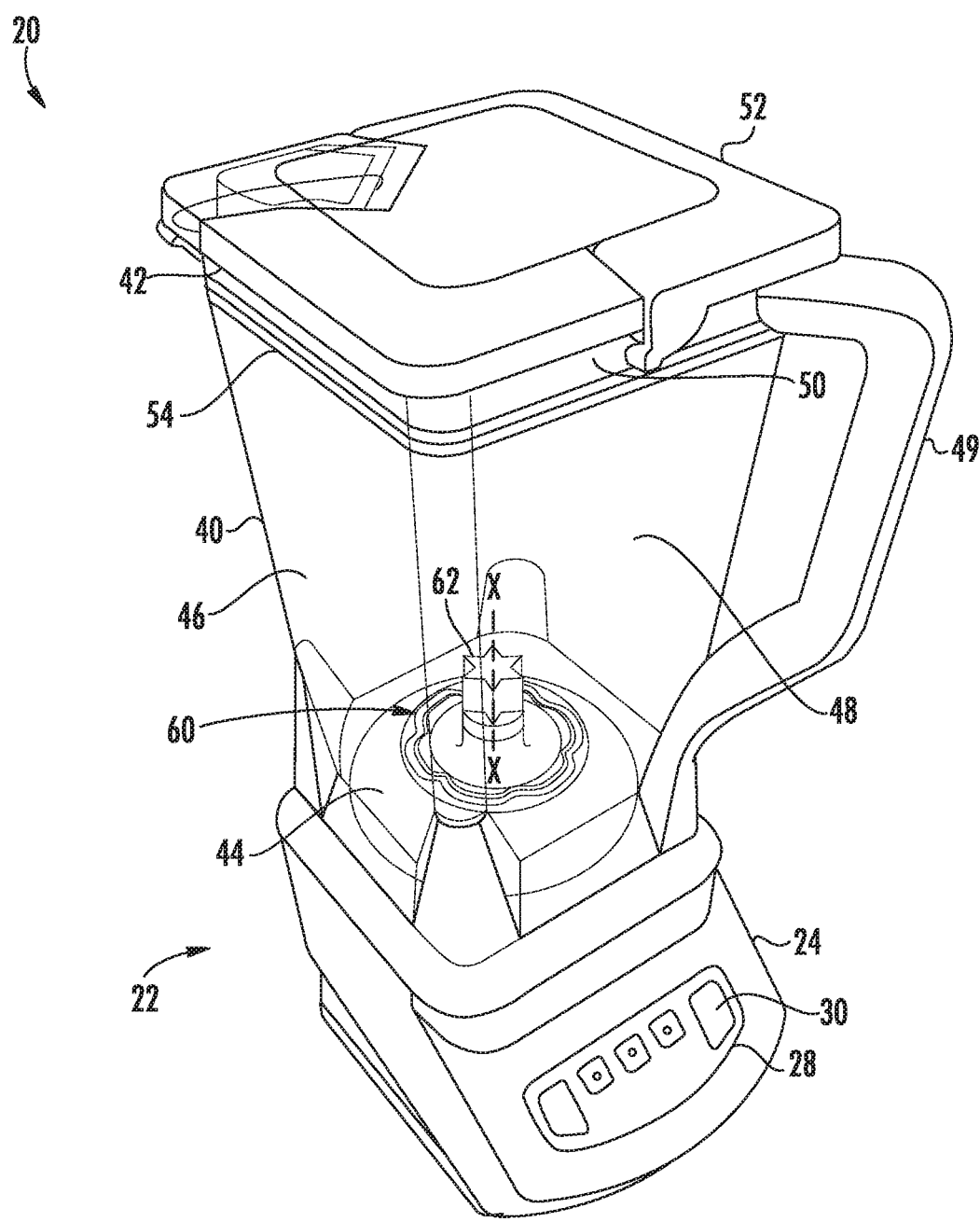
FIG. 1 is a perspective view of an example of a food processing system.

Referring now to the FIG. 1, an example of a multi-functional food processing system 20 is illustrated in more detail. In general, the food processing system 20 can be adapted to perform any food processing or blending operation including as non-limiting examples, dicing, chopping, cutting, slicing, mixing, blending, stirring, crushing, or the like. Although an example of a food processing system 20 is illustrated and described herein, other food processing systems are within the scope of the present disclosure. The food processing 20 system includes a base 2 having a body or housing 24 within which a motorized unit (not shown) and at least one controller (not shown) are located. The base 22 includes at least one rotary component, such as a drive coupler (not shown) for example, driven by the motorized unit within the body 24. The base 22 additionally includes a control panel or user interface 28 with including at least one input device 30 for turning the motorized unit on and off and for selecting various modes of operation, such as pulsing, blending, or continuous food processing.

The food processing system 20 additionally includes a container 40 adapted (e.g. sized and dimensioned) to receive one or more food products therein to be processed. The container 40 generally includes a first end 42, a second end 44, and one or more walls 46 extending there between to define an interior chamber 48 within which food products are placed and processed. As shown in the illustrated, non-limiting embodiment, a handle 49 may be integrally formed with at least a portion of the container 40, such as a sidewall 46 for example. As best shown in the embodiment illustrated in FIG. 1, the top 42 of the container 40 includes an opening 50 that provides access for the one or more food items into the chamber 48. The second end 44 is generally closed such that food products contained within the chamber 48 are unable to escape through the second end 44.

A lid 52 generally complementary in size to the opening 50 is attached to the first end 42 of the container 40. The lid 52 may be removably secured to the container 20, such as via a plurality of threads, or a press-fit configuration. Alternatively, the lid 52 may be configured to fixedly attach to the first end 22 of the container 40. Inclusion of the lid 52, such as during a food processing and/or blending operation restricts movement of the one or more food products from the chamber 48 via the first end 42 of the container 40. In one embodiment, the lid 52 may be shaped or include one or more features to prevent the accumulation of food particles thereon. In addition, a gasket 54 may be positioned between the lid 52 and the first end 42 to form a seal preventing solid and liquid food products from spilling out at the interface between the lid 52 and the opening 50.

Depending on the type of food processing system 20 being used, the container 40 may be configured to slidably or rotatably attach to the base 22. In the illustrated, non-limiting embodiment, the container 40 is moved vertically to connect to the base 22. However, in other embodiments, sliding and/or rotational movement of the container 40 in a direction other than the direction of downward movement of container 40 onto the base 22 may be necessary to successfully mount the container 40 to the base 22. In one embodiment, the connection formed between the base 22 and the container 40 is intended to limit unintended movement of the container 40 relative to the base 22 during operation of the food processing system 20.

In the illustrated, non-limiting embodiment, a rotatable assembly 60 including a spindle 62 extends through the second end 44 into the chamber 48 of the container 40. Mounted to a portion of the spindle 62 adjacent an underside of the container 40 is a coupling component (not shown) configured to engage the rotary component of the base 22. As a result of this engagement, the motorized unit within the base 22 may be used to drive rotation of the spindle 62 about an axis X. A plurality of interchangeable attachments 70 varying in size and/or functionality may be configured for use with the rotatable assembly 60 for the processing of food products located within the chamber 48 of container 40.

Referring now to FIGS. 2-5, the food processing system 20 is adapted for use with a plate 70 including a plurality of openings 72 arranged about a periphery of the plate 70 at distinct locations. Each opening 72 is configured to receive a dicing blade 74. In the illustrated, non-limiting embodiment, the plate 70 includes four openings 72 for receiving up to four dicing blades 74, each having a unique configuration. However, it should be understood that a plate 70 having two or more openings 72 for receiving various blades 74 are within the scope of the disclosure. The dicing blades 74 may be interchangeable and are accessed and removably inserted into the openings 72 via a side of the plate 70.

The plate 70 is configured to mount within the container 40 near the first end 42 thereof in a generally horizontal orientation. A lip (not shown) may be formed in an interior surface of the container 40 to retain the plate 70 in a position near the lid 52. In one embodiment, a diameter of the plate 70 is complementary to, for example, substantially identical to or slightly smaller than, a diameter of the chamber 48.

Figure 2:
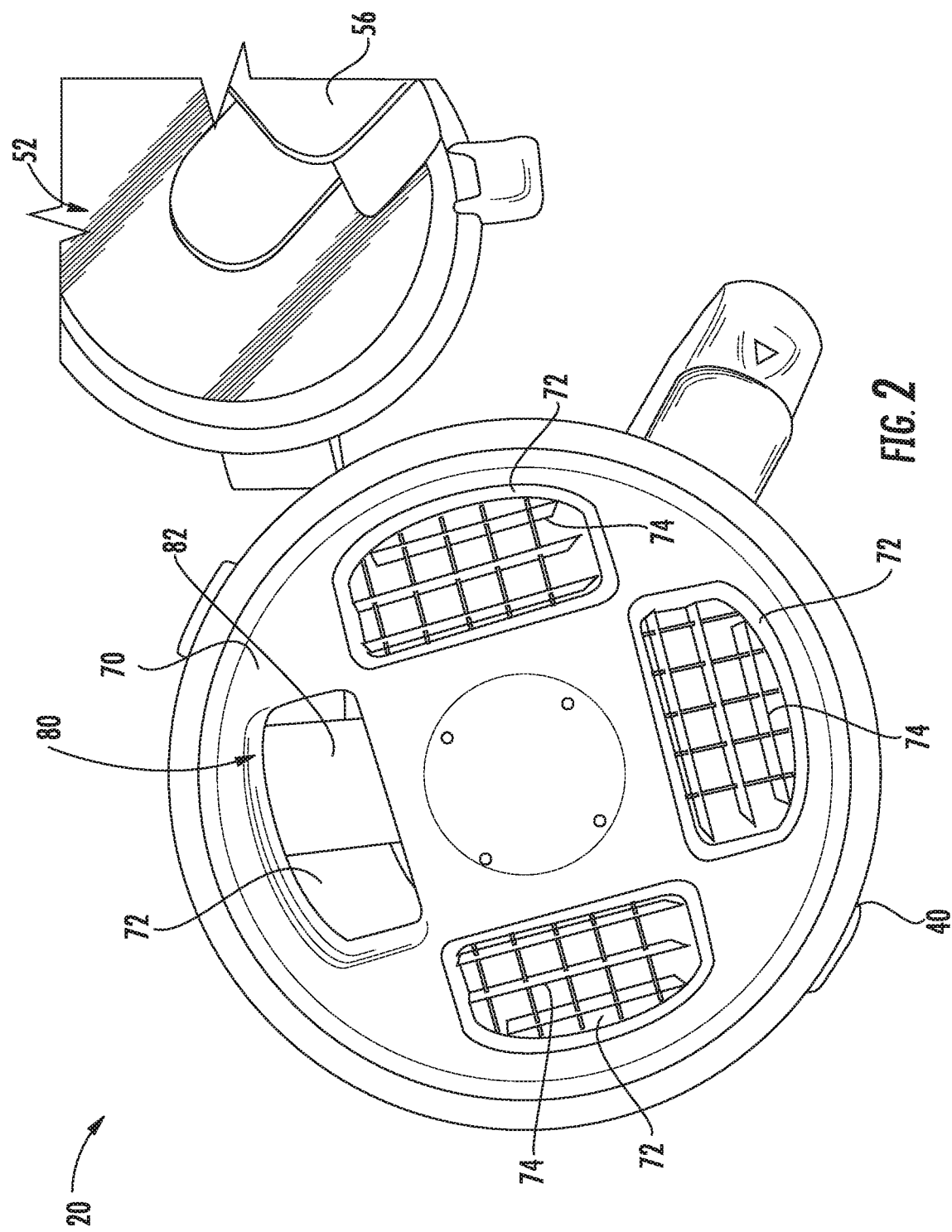
FIG. 2 is a perspective view of a blade assembly and a blade plate associated with a container of the food processing system according to an embodiment.
Figure 3:
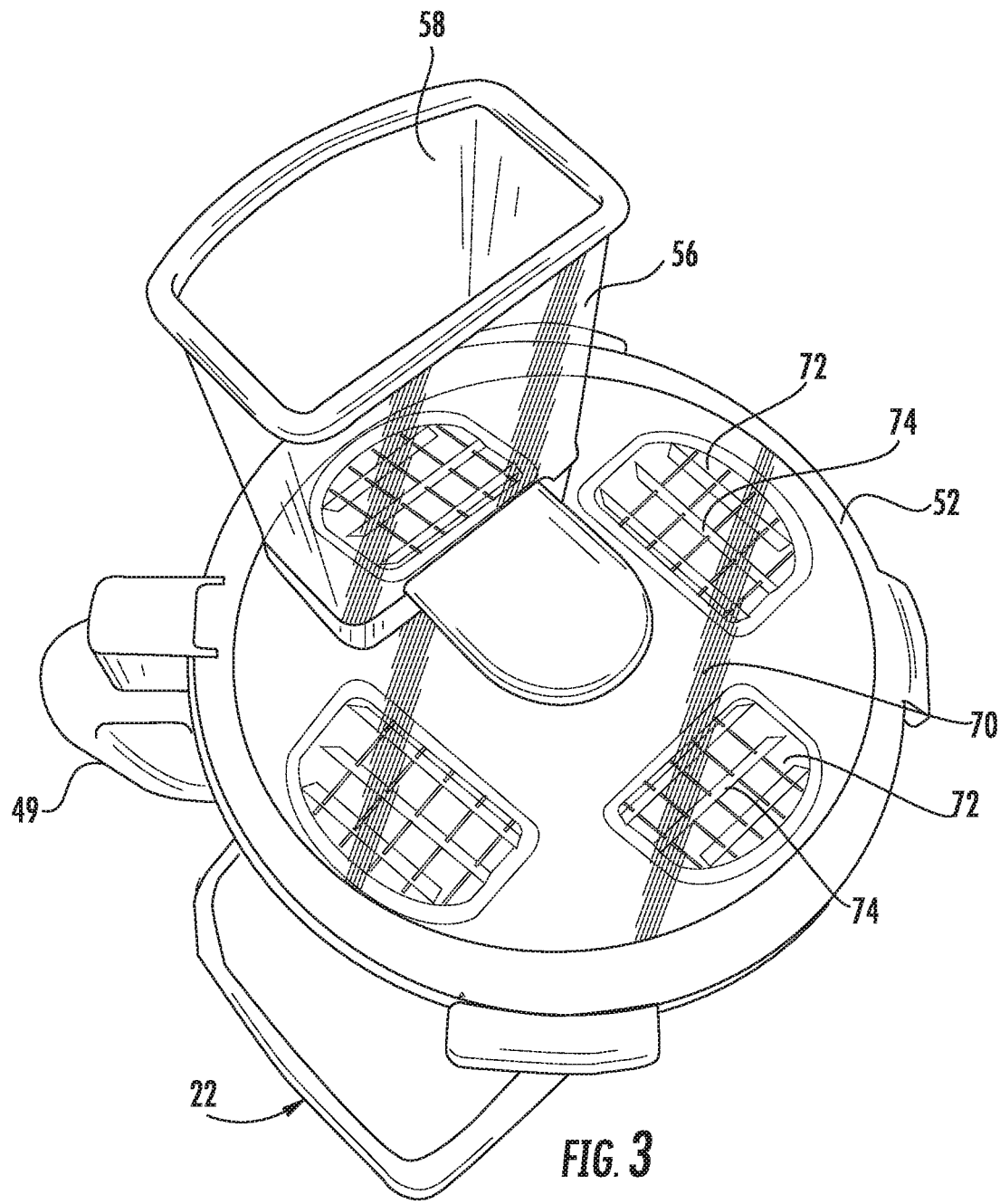
FIG. 3 is a perspective view of a lid and chute of the food processing system arranged in a first position associated with a food processing configuration according to an embodiment.

In some embodiments, a blade assembly 80, best shown in FIG. 2, may be mounted to the a portion of the rotatable assembly 60, such as the spindle 62 for example, for rotation about axis X. The blade assembly 80 includes at least one blade 82 having one or more blade surfaces for cutting a food item as the blade assembly 80 rotates about axis X. When positioned within the container 40, the blade assembly 80 is arranged directly adjacent an underside of the plate 70 such that the at least one blade 82 is configured to further cut a food item extending through one of the plurality of dicing blades 74 mounted to the plate 70.

To operate the food processing system 20, an operator installs the plate 70 within the chamber 48 of the container 40. The user will then couple the lid 52 to the first end 42 of the container 40. The lid 52 of the food processing system 20 includes a chute 56 (FIG. 3) having a passageway 58 through which a food item may be inserted into the chamber 48 of the container 40 for processing. The lid 52 is attached to the container 40 such that chute 56 of the lid 52 is in a position aligned with a desired one of the plurality of dicing blades 74. The lid 52 is configured to attach to the container 40 in a plurality of positions. Alternatively, or in addition, the plate 70 may be configured to attach to the container 40 at a plurality of positions, for example in instances where the lid 52 and the associated chute 56 may affix to the container 40 in only a single position. For each position of the lid 52 and/or plate 70, the passageway 58 of the chute 56 is arranged in communication with one of the plurality of dicing blades 74.

After attaching the lid 52, a user initiates operation of the food processing system 20, and feeds a desired food item into the chute 56, such as with a pusher or plunger for example. The force applied by the user causes the food item to engage the adjacent dicing blade 74, which cuts the food item in a first direction extending vertically and parallel to the longitudinal axis of the chute 56. This configuration of the plate 70 may be used to form vertical slices or fries of a food item. In embodiments where the food processing system 20 additionally includes a blade assembly 80 coupled to the spindle 62, the rotation of the at least one blade 82 of the blade assembly 80 further cuts the food item in a second horizontal direction, perpendicular to the cuts of the dicing blade 74.

Figure 4:
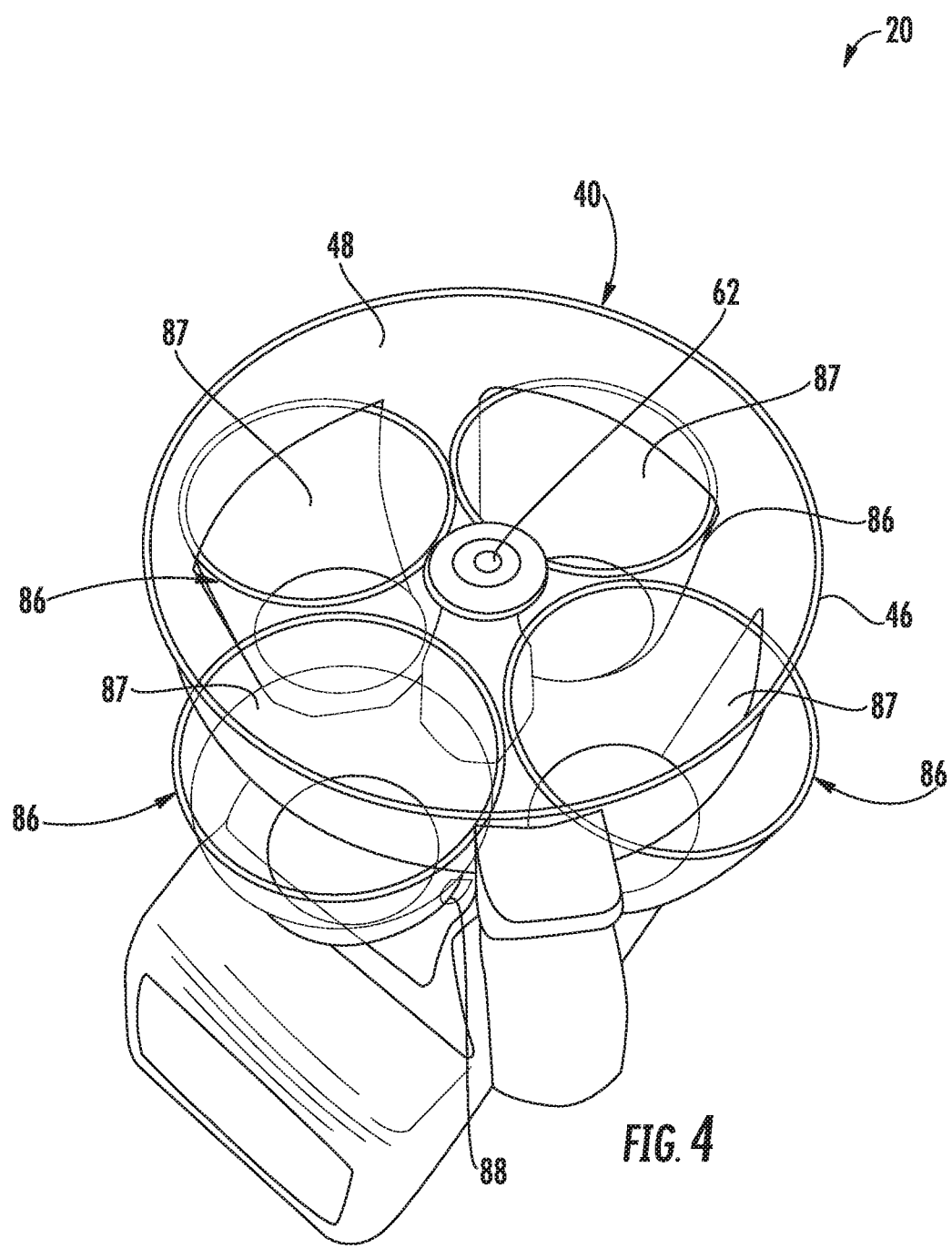
FIG. 4 is a perspective view of a food processing system including a plurality of small containers associated with each blade of a blade plate according to an embodiment.
Figure 5:
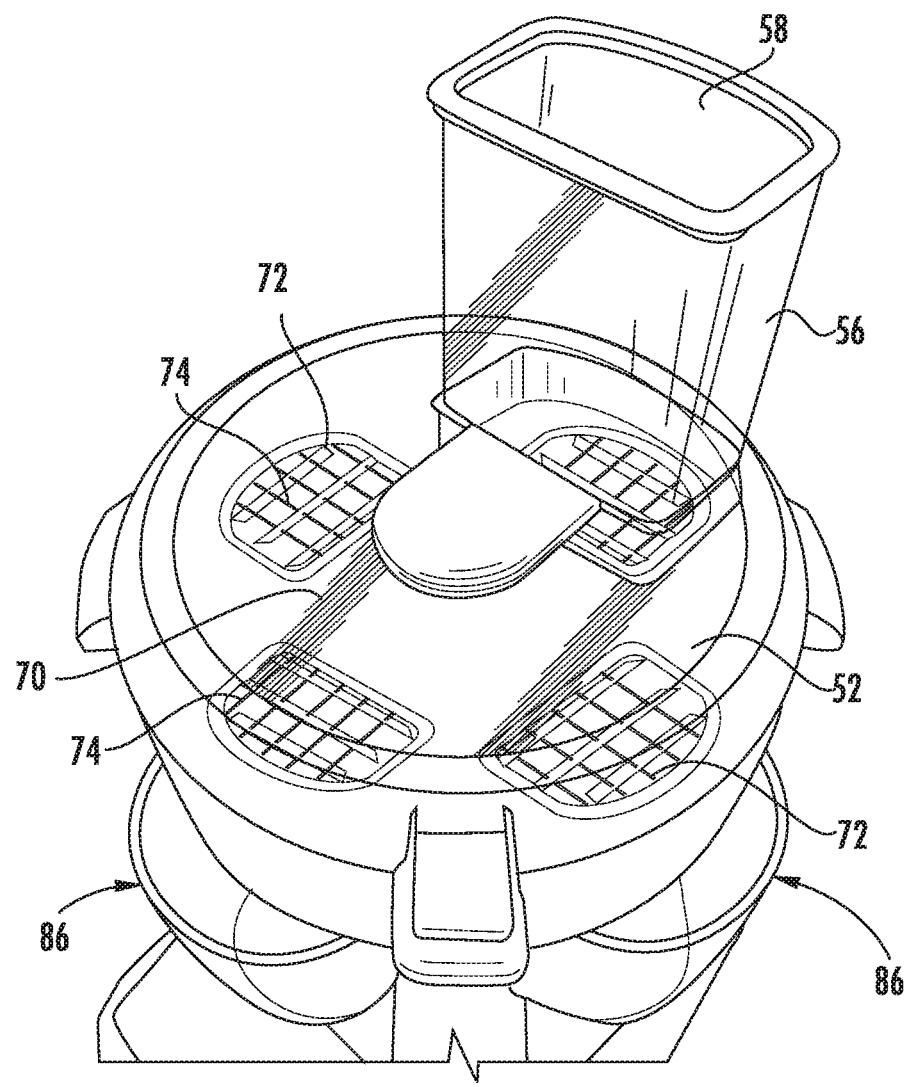
FIG. 5 is a perspective view of the food processing system of FIG. 4 having a lid and chute mounted thereto according to an embodiment.

In one embodiment, as can be seen in FIGS. 4 and 5, the container 40 includes at least one smaller container 86 arranged at least partially within chamber 48. In the illustrated, non-limiting embodiment, the container 40 includes a plurality of smaller containers 86, that may be removably inserted via an opening 88 formed in a portion of the container 40, such as the sidewall 46 thereof for example. Each of the plurality of smaller containers 86 may be associated with one of the plurality of openings 72 and dicing blades 74 of the plate 70. Accordingly, as a user processes a first food item via a blade 74 arranged at a first location of the plate 70, the first food item is received within a chamber 87 of the smaller container 86 associated with that position. In one embodiment, the chute 56 may be repositioned to another location such that a second food item may be processed via a second dicing blade 74 and received within the chamber 87 of a smaller container 86 associated with the second position. In one embodiment, the position of the smaller containers 86 may rotate with the plate 70 relative to the lid 52, such as when the feed chute 56 is configured to attach to the container 40 in only a single position for example.

Figure 6:
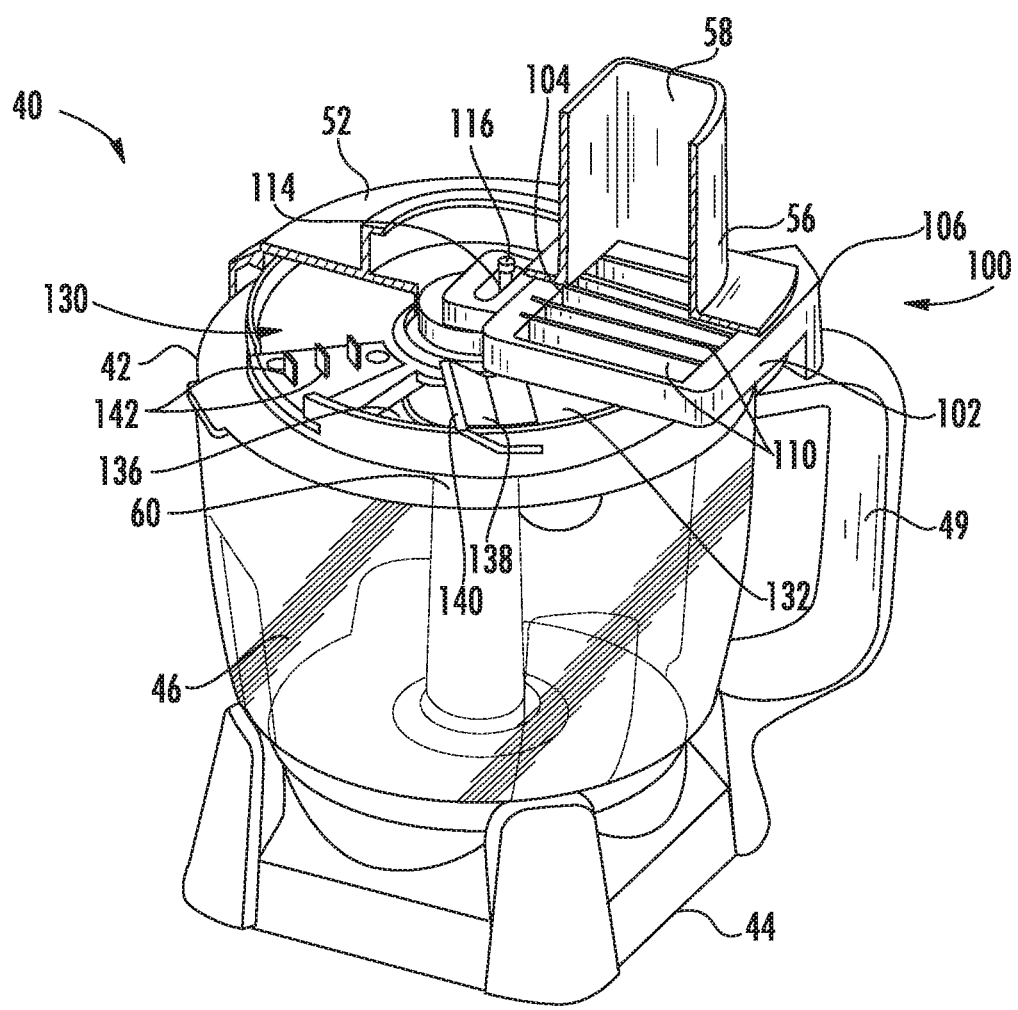
FIG. 6 is a perspective view a food processing system including an oscillating blade according to an embodiment.
Figure 7:
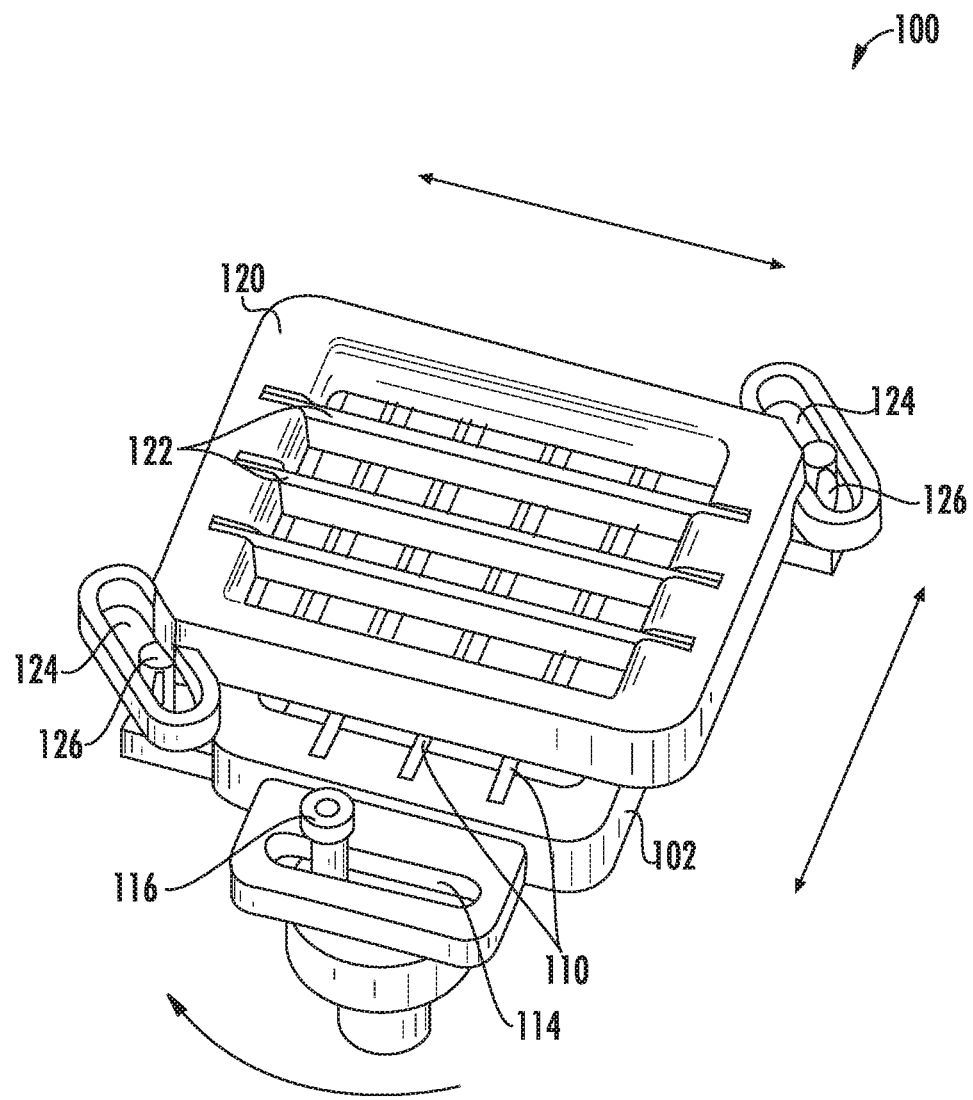
FIG. 7 is a perspective view of another embodiment of an oscillating blade according to an embodiment.
Figure 8:
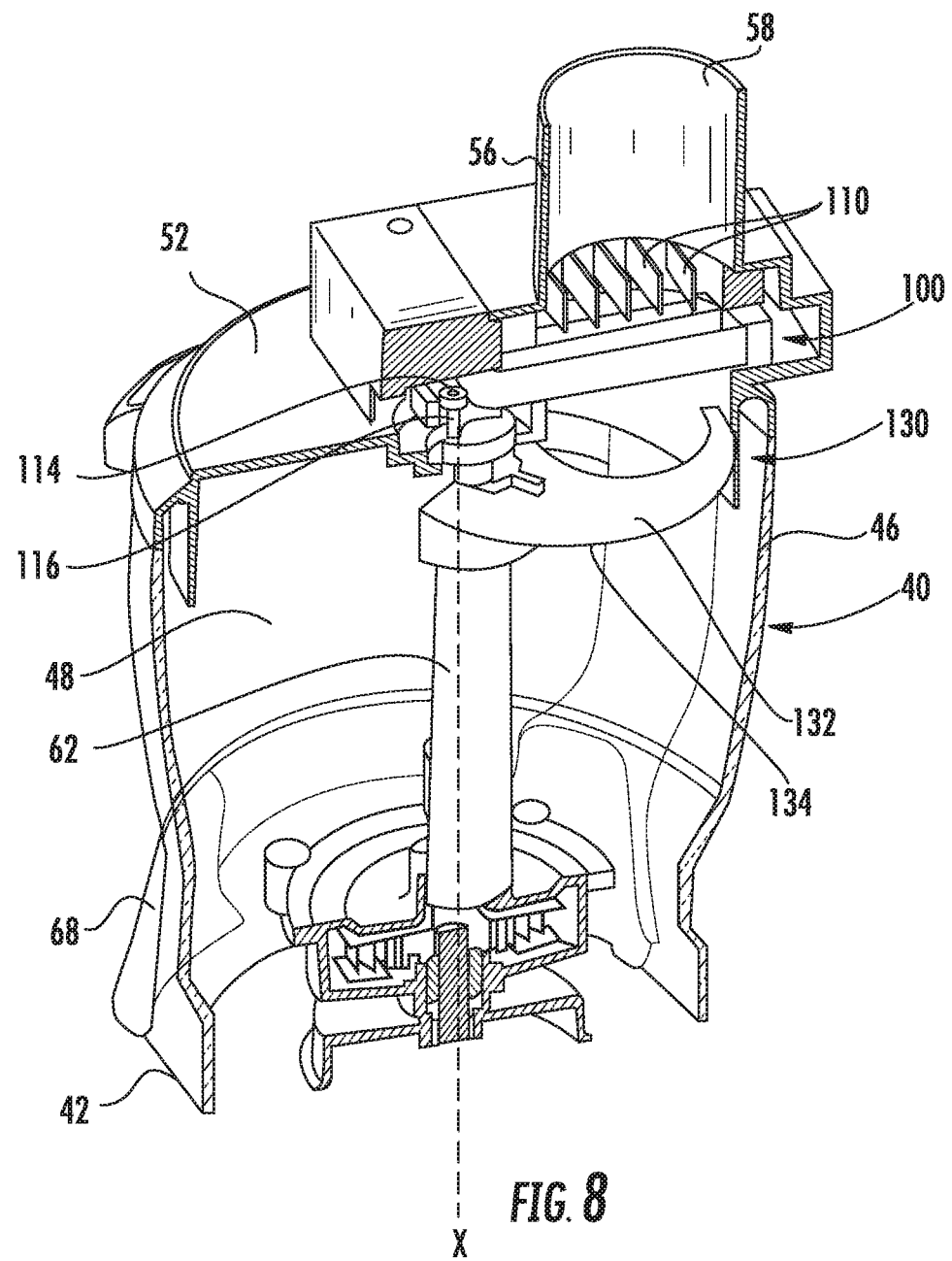
FIG. 8 is a cross-sectional of the food processing system include the oscillating blade of FIG. 7 according to an embodiment.

Referring now to FIGS. 6-8, another configuration of a food processing system 20 is illustrated. As shown, an oscillating blade 100 is mounted adjacent the first end 42 of the container 40. The oscillating blade 100 includes a generally rectangular frame 102 having a plurality of blades 110 extending between a first surface 104 and a second, opposite surface 106 of the frame 102. The blades 110 are arranged generally parallel to one another and are separated from one another by a distance. As shown, the blades 110 are oriented vertically such that a cutting surface of each blade 110 is arranged at the uppermost surface of the blade 110.

The frame 102 is positioned such that movement of the frame 102 is restricted a first direction. In the illustrated, non-limiting embodiment, a corner of the frame 102 is arranged in contact with an adjacent portion of the lid 52, such that the contact there between limits movement of the frame 102 in the first direction. A portion of the frame 102 arranged generally adjacent the center of the container 40, substantially aligned with a portion of the rotatable assembly 60 includes a slot 114. A screw or pin 116 movably coupled to the distal end of the rotatable assembly 60 is arranged within the slot 114. As the rotatable assembly 60 rotates about an axis, the screw 116 moves within the slot 114 causing the frame 102 and the blades 110 therein to oscillate. Because movement of the frame 102 is restricted in a first direction, the oscillation of the frame 102 and blades 110 occurs in only one direction or along an axis, for example parallel to the longitudinal axis of the blades 110.

Another embodiment of the oscillating blade 100 is shown in FIG. 7. In this configuration, the oscillating blade 100 includes a first frame 102 having a plurality of first blades 110 extending in a first direction and a second frame 120 having a plurality of second blades 122 extending in a second direction. The first direction and the second direction may, but need not be generally perpendicular to one another. As shown, the first frame 102 and the second frame 120 are stacked one on top of the other. In the illustrated, non-limiting embodiment, the first blades 110 and the second blades 122 are both oriented vertically such that the cutting surfaces of both are arranged at an uppermost edge, respectively.

As previously described, a portion of the first frame 102 includes a slot 114 aligned with the rotatable assembly 60 of the container 40. In addition, the first frame 102 abuts a portion of the container 40 to restrict movement of the first frame 102 in a first direction. The second frame 120 similarly includes one or more extended portions having a slot 124 formed therein. The slots 124 of the second frame 120 are configured to receive a pin 126 extending from an adjacent portion of the first frame 102. The interface between the pins 126 of the first frame 102 and the slots 124 of the second frame 120 restricts movement of the second frame 120 relative to the first frame 102 in a second direction. As a result, when a screw 116 extending from a spindle 62 or other rotating component moves within the slot 114 of the first frame 102, the motion is transmitted to both the first frame 102 and the second frame 120 simultaneously. However, movement of the first frame 102 in the first direction is partially restricted by engagement with the container 40 and movement of the second frame 120 is partially restricted by the interface with the container 40. As a result, the first frame 102 may be configured to oscillate in a first direction parallel to the longitudinal axis of the plurality of first blades 110, and the second frame 120 may be configured to oscillate in a second direction parallel to the longitudinal axis of the plurality of second blades 122. In the illustrated, non-limiting embodiment, the oscillation of the plurality of first blades 110 is perpendicular to the oscillation of the plurality of second blades 122.

Although the embodiment of the food processing system. 20 illustrated in FIG. 6 only includes a single oscillating blade 100, embodiments including a plurality of oscillating blades 100, each having a distinct blade configuration are considered within the scope of the application. The plurality of oscillating blades 100 may be mounted at various positions about the periphery of the container 40. For example, the plurality of oscillating blades may be integrally formed into a blade plate 70.

With reference to FIGS. 6 and 8, the food processing system 20 may additionally include a blade assembly 130 configured to rotate about axis X. In the embodiment of FIG. 8, the blade assembly 130 is mounted to the rotatable assembly 60 and includes at least one blade 132 having one or more cutting surfaces for cutting a food item as the blade 132 rotates about the axis of rotation X. When positioned within the container 40, the blade assembly 130 is arranged directly adjacent an underside of the plate 70 such that the at least one blade 132 is configured to further cut a food item extending through an oscillating blade 100 mounted to the plate 70.

In the embodiment of FIG. 6, the blade assembly 130 includes a disc 134 having an opening 136 formed therein. A blade 138 having at least one cutting surface 140 is arranged directly adjacent the opening 136. As the blade assembly 130 rotates about the axis of rotation X, the at least one cutting surface 140 engages the food item provided at the outlet of the oscillation blade 100. The at least one cutting surface 140 of the blade 138 extends perpendicular to the blades of the oscillation blade 100, for example in a horizontal plane. Inclusion of the disc 134 thereby limits the height of the food produced. In the illustrated, non-limiting embodiment, the disc 134 additionally includes one or more vertically extending blades 142 configured to further vertically slice the food item output from the oscillation blade 100. In such embodiments, the at least one vertical blade 142 is arranged upstream from the opening 136 and the blade 138 relative to the direction of rotation of the disc 134.

To operate the food processing system 20, a user installs the at least one oscillation blade 100 relative to the container 40. The user will then couple the lid 52 to the first 42 of the container 40 such that the chute 56 is in a position aligned with a desired oscillating blade 100 or opening 72. In embodiments including a plurality of oscillating blades 100, the lid 52 may be configured to attach to the container 40 in a plurality of positions. Alternatively, or in addition, the at least one oscillating blade 100 may be configured to attach to the container 40 at a plurality of positions, for example in instances where the lid 52 or the chute 56 may affix to the container 40 at only a single position. After attaching the lid 52, a user initiates operation of the food processing system 20, and feeds a desired food item into the chute 56. Application of a force to the food item, such as with a plunger for example, may no longer be necessary or may be greatly reduced, due to the vibration of the blades, which cut the food item in a first, vertical direction, to form slices or fries. In embodiments where the food processing system 20 additionally includes a blade assembly 130 coupled to the rotatable assembly 60, the rotation of the at least one blade of the blade assembly 130 further cuts the food item in a second horizontal direction, perpendicular to the cuts of the oscillating blade 100. Although the food processing system 20 is illustrated and described as having the oscillating blade 100 arranged upstream of a blade plate 70 or disc 134 relative to a path of travel of a food item, embodiments where the oscillating blade 100 may be arranged downstream from the blade plate 70 or disc 134, or embodiments that do not include an oscillating blade are also contemplated herein.

The food processing systems 20 described herein provide the user with increased functionality for an attachment associated with the system 20. A user will no longer need to continually replace components of the system 20 to achieve different size cuts or slices.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless other wise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A food processing system, comprising:
a food processor base;
a container connectable to said food processing base, said container having a processing chamber and a first open end;
a rotatable assembly disposed within said processing chamber; and
at least one cutting assembly for performing a food processing operation, said at least one cutting assembly being operably coupled to said rotatable assembly;
wherein an initial operation of said at least one cutting assembly is configured to cut a food item in a first, generally vertical direction, said at least one cutting assembly including an oscillating blade for performing said initial operation, said oscillating blade being driven by rotation of said rotatable assembly about an axis; and
wherein a later operation of said at least one cutting assembly is configured to cut said food item in a second direction, said second direction being distinct from said vertical direction.

2. The food processing system according to claim 1, wherein said first direction and said second direction are generally perpendicular to one another.

3. The food processing system according to claim 1, wherein said second direction includes a generally horizontal direction.

4. The food processing system according to claim 1, wherein said blade plate is stationary and said plurality of blades is arranged about a periphery of said blade plate.

5. The food processing system according to claim 4, wherein said at least one cutting assembly further comprises a blade assembly operably coupled to a rotatable component of said food processor, said blade assembly being arranged adjacent an underside of said blade disc.

6. The food processing system according to claim 5, wherein said blade assembly is configured to further cut said food item in said second direction.

7. The food processing system according to claim 4, wherein said blade plate is mounted within said processing chamber of said container.

8. The food processing system according to claim 7, further comprising at least one smaller container removably coupled to said container such that said smaller container is disposed within said hollow chamber, each smaller container being associated with one of said plurality of blades of said blade disc.

9. The food processing system according to claim 4, further comprising a lid including an opening arranged in communication with said food processor, wherein at least one of said opening and said blade plate is movable between a plurality of positions such that said opening is associated with one of said plurality of blades of said blade plate.

10. The food processing system according to claim 1, wherein movement of said oscillating blade is partially restricted by a lid connectable to said first open end of said container.

11. The food processing system according to claim 1, wherein said at least one cutting assembly further comprises a rotatable assembly, and movement of said oscillating blade is driven by rotation of said rotatable assembly about an axis.

12. The food processing system according to claim 1, wherein said oscillating blade includes a plurality of first blades oscillating along a first axis and a plurality of second blades oscillating along a second axis, said second axis having a different orientation than said first axis.

13. The food processing system according to claim 1, wherein a second operation of said food processor is configured to cut said food item in another vertical direction, distinct from said vertical direction of said initial operation, said second operation occurring after said initial operation and before said later operation.

* * * * *